United States Patent [19]
Osborn et al.

[11] Patent Number: 6,053,533
[45] Date of Patent: Apr. 25, 2000

[54] MODULAR FUEL TANK ASSEMBLY, VEHICLE MOUNTING ARRANGEMENT AND METHOD FOR INSTALLATION

[75] Inventors: Thomas J. Osborn; Roger W. Byers; Harold H. Hayes; James P. Manning; Michael C. DePoy, all of Fort Wayne; John M. Ammer, New Haven; Jeffery D. Jenks; Nathan L. Schuler, both of Fort Wayne; Estle V. Townsend, Jr., Decatur; Robert G. Beineke, Fort Wayne, all of Ind.

[73] Assignee: Navistar International Transportation Corp, Chicago, Ill.

[21] Appl. No.: 08/974,769

[22] Filed: Nov. 20, 1997

[51] Int. Cl.⁷ ....................................................... B60P 3/22
[52] U.S. Cl. ............................................................. 280/830
[58] Field of Search ................................ 280/163, 164.1, 280/760, 769, 831, 834, 833, 183, 35.1

[56] References Cited

U.S. PATENT DOCUMENTS 4,925,235  5/1990  Fingerle ............................... 296/180.2
5,330,031  7/1994  Hill ........................................ 180/271

Primary Examiner—Christopher P. Schwartz
Assistant Examiner—C. T. Bartz
Attorney, Agent, or Firm—Jeffrey P. Calfa; Dennis K. Sullivan

[57] ABSTRACT

A mounting arrangement for a modular component such as a fuel tank for a vehicle such as a truck and a method of installing same on the vehicle. The method is accomplished via a combination of a set or sets of two brackets and an initial alignment means for each set of brackets. The initial alignment means is comprised of two mating components, with one mating component being a portion of one bracket and the other mating component being a portion of the second bracket. One bracket of each set is installed directly to a portion of the vehicle under manufacture, such as to the frame rail. A modular assembly is assembled separately with the second bracket of each set installed on the modular assembly. The sets of brackets are joined via the initial alignment means attaching the modular assembly to the vehicle. Final attachment may then be made between the set or sets of two brackets and hence the modular assembly and the vehicle, while the modular assembly is held into proper position via the initial alignment means.

25 Claims, 4 Drawing Sheets

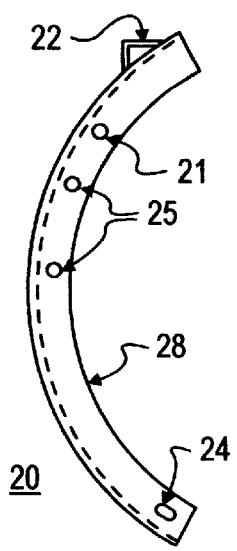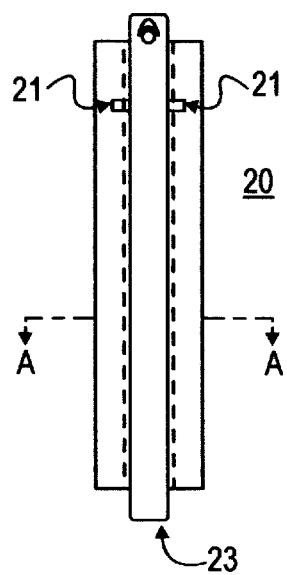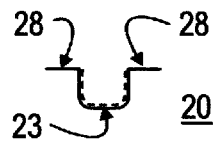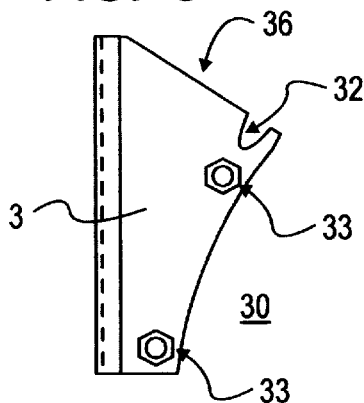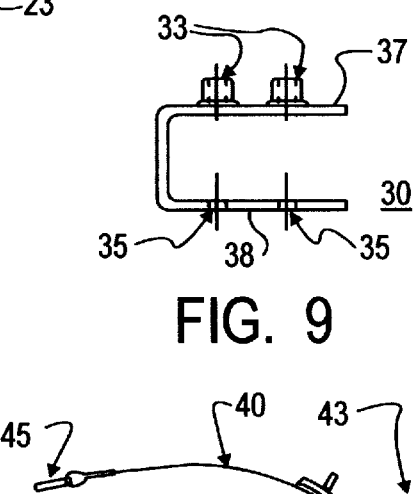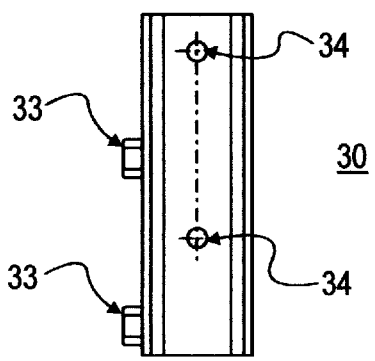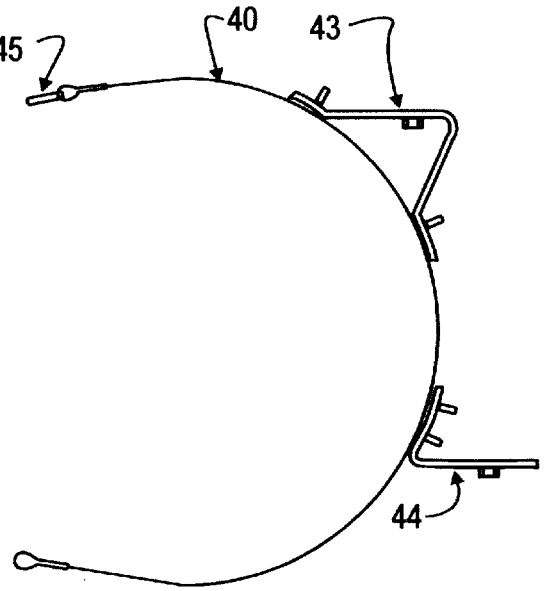

MODULAR FUEL TANK ASSEMBLY, VEHICLE MOUNTING ARRANGEMENT AND METHOD FOR INSTALLATION

BACKGROUND OF THE INVENTION

The present invention relates to a modular fuel tank and mounting arrangement for a vehicle such as a truck or a bus and a method of installing same on the vehicle. More specifically, the design of the mounting arrangement allows the fuel tank and entry/egress steps to be sub-assembled off of a main assembly line and brought to the main assembly line as a unit for installation with little or no alignment required. The mounting arrangement may be applied to other modular assemblies for vehicles such as battery boxes and air tanks.

THE PRIOR ART

Heretofore, components such as fuel tanks on trucks and buses were installed via a time consuming and man power intensive process on the main assembly for the vehicle. As each vehicle was moved into the fuel tank installation portion of the assembly line, a hanger bracket was bolted to the frame rail. This hanger bracket was shaped semi-circular or 'L' shaped to receive a round or 'D' shaped tank respectively. Line personnel physically moved the fuel tank up to the hanger bracket and while holding the tank against the bracket, wrapped tank straps with linking bolts around the tank. Each tank strap was fastened at one end with bolting through the frame rail side member and the other end with bolting to the hanger bracket. The process was cumbersome due to the bulky nature of the fuel tank. Time was required to align the fuel tank so that access points such as the filling point were properly situated. Fuel tank mounted entry/egress steps could only be installed after tank installation on the vehicle.

SUMMARY OF THE INVENTION

Accordingly, a primary object of the apparatus and method of the present invention is to provide the vehicle with a fuel tank assembly with a mounting means which allows the fuel tank and entry/egress steps to be sub-assembled off of the main vehicle assembly line, brought to the main assembly line as a unit, and installed with little or no alignment effort required on the main assembly line.

The method of achieving this type of installation is accomplished via a combination of a set or sets of two brackets and an initial alignment means for each set of two brackets. The initial alignment means is comprised of two mating components, with one mating component being a portion of one bracket and the other mating component being a portion of the second bracket. One bracket of each set is installed directly to a portion of the vehicle under manufacture, such as to the frame rail. A modular assembly, in the case described in detail below a fuel tank assembly, is assembled separately with the second bracket of the set installed on the modular assembly. The modular assembly is moved to the main assembly line where the sets of brackets are joined via the initial alignment means. The initial alignment means allows the modular assembly to be temporarily attached to the vehicle with little or no alignment effort. Final attachment may then be made between the set or sets of two brackets and hence the modular assembly and the vehicle, while the modular assembly is held into proper position via the initial alignment means. One or more set or sets of brackets will be needed depending on the geometry and size of the modular assembly to be installed.

BRIEF DESCRIPTION OF THE DRAWINGS

Other objects and advantages of the invention will become more apparent upon perusal of the detailed description thereof and upon inspection of the drawings in which:

FIG. 5 is a side view of a tank bracket of the fuel tank assembly of FIG. 1.

FIG. 6 is a front view of the tank bracket of FIG. 5.

FIG. 7 is a cross sectional view of the tank bracket at line A—A of FIG. 6.

FIG. 8 is a side view of a rail bracket of the fuel tank assembly of FIG. 1.

FIG. 9 is a bottom view of the rail bracket of FIG. 8.

FIG. 10 is a front view of the rail bracket of FIG. 8.

FIG. 11 is a side view of a tank strap with entry/egress steps installed of the fuel assembly of FIG. 1.

DESCRIPTION OF THE PREFERRED EMBODIMENT

Figure 1:
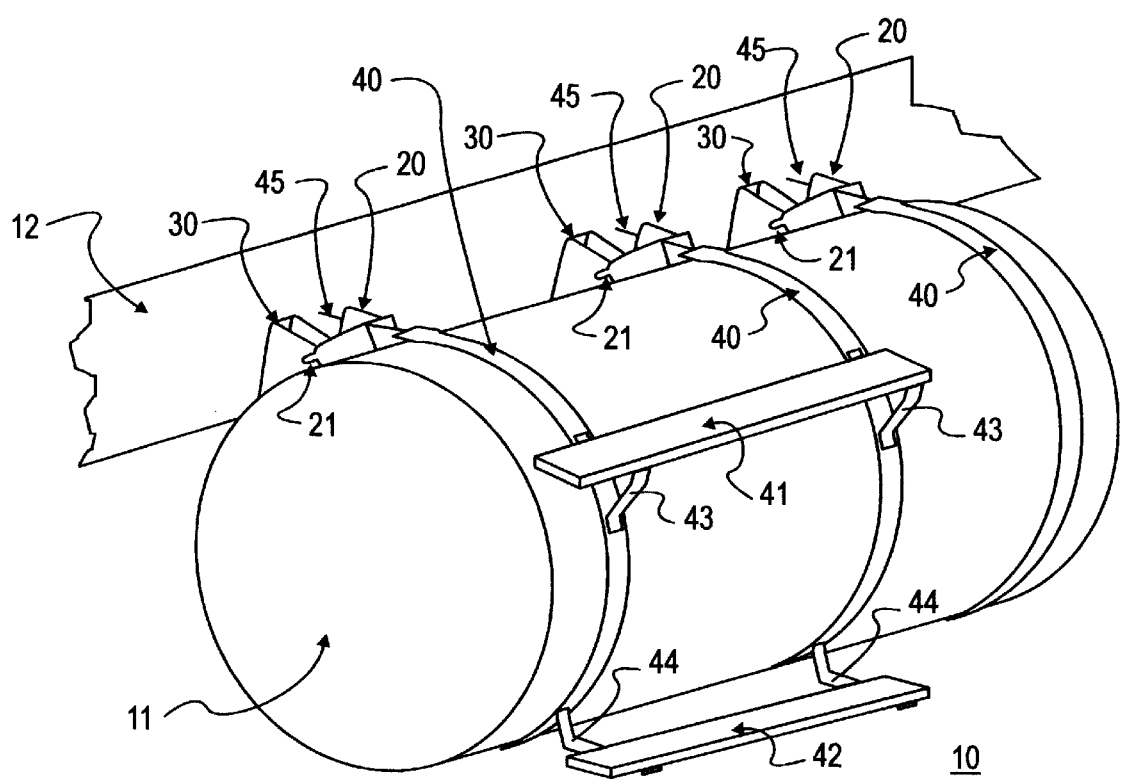
FIG. 1 is a perspective view of the fuel tank assembly of the present invention installed to a frame rail of a vehicle using a cylindrical tank.
Figure 3:
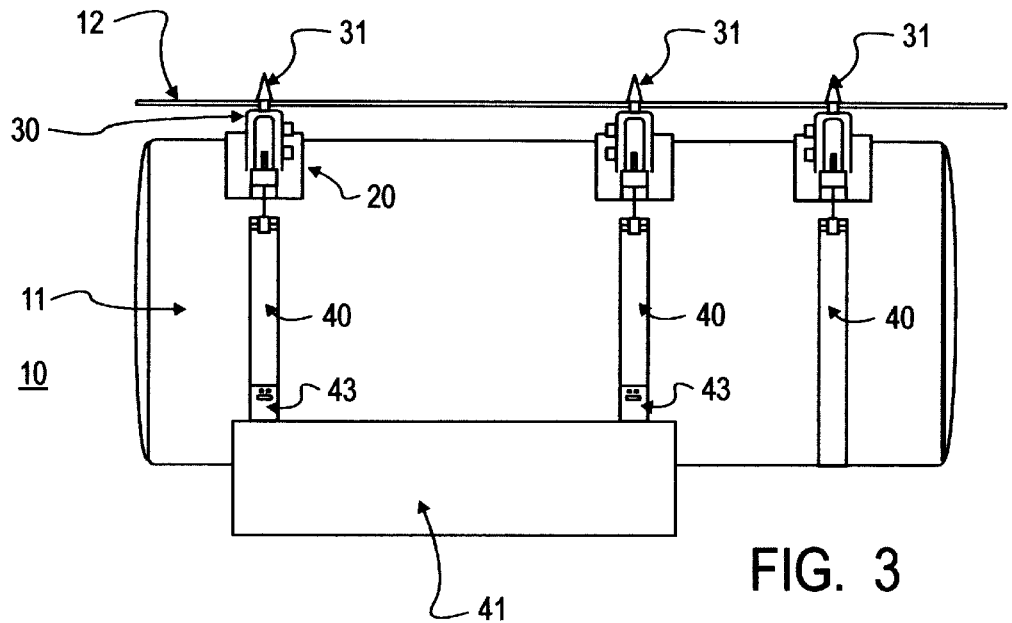
FIG. 3 is a top view of the fuel tank assembly of FIG. 1.
Figure 4:
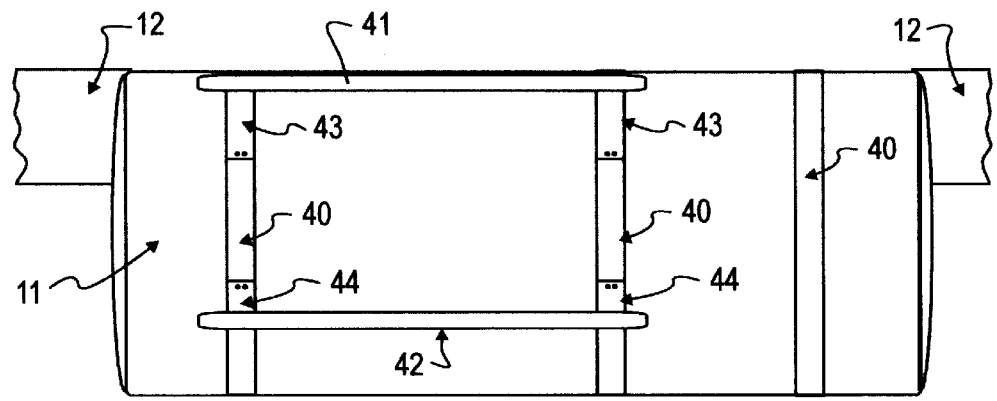
FIG. 4 is a side view of the fuel tank assembly of FIG. 1.
Figure 2:
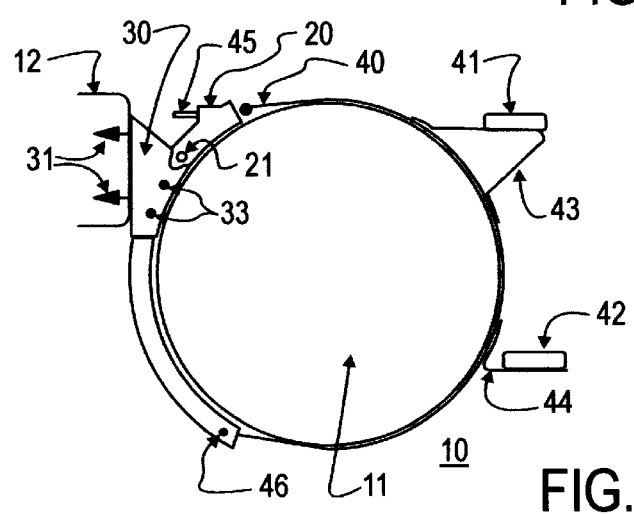
FIG. 2 is a front view of the fuel tank assembly of FIG. 1.

Referring now to the drawings in greater detail there is illustrated in FIG. 1 a fuel tank assembly 10 installed to a frame rail 12 of a vehicle 101 (not shown) made in accordance with the teachings of the present invention.

The fuel tank assembly 10 is generally comprised of four types of main components: a fuel tank 11; at least two tank brackets 20; at least two rail brackets 30; and at least two tank straps 40. FIGS. 1–4 show an embodiment of the invention with three tank brackets 20, three rail brackets 30 and three tank straps 40. Each tank bracket 20 is combined with a tank strap 40, as will be described in more detail below, to encircle the fuel tank 11. The rail brackets 30 are installed to the frame rail 12 of the vehicle 101. The fuel tank 11 with the tank brackets 20 and tank straps 40 installed is moved up so that the tank brackets 20 meet up with the rail brackets 30. At this point the tank brackets 20 and rail brackets 30 are final bolted up together.

The fuel tank 11 is cylindrically shaped as shown in FIGS. 1–4, however other shaped tanks such as 'D' or rectangular shaped tanks, may also be installed under this invention with variations in the shapes of the tank brackets 20 and tank straps 40. Separate from the main vehicle assembly line, the fuel tank 11; the tank brackets 20 and the tank straps 40 are combined as follows. Each tank bracket 20 is semi-circularly shaped piece formed with a mating surface 28 to mate with a portion of the outer radial surface of the fuel tank 11. Each tank bracket 20 has an upraised u-bend 23 or top hat shape when viewed cross sectionally. The u-bend 23 runs down the center of the entire length of the tank bracket 20. A strap bolt cowl 22 extends out from the U-bend 23 at one end of the tank bracket 20. Each tank bracket 20 has two alignment pins 21, symmetrically located near the end of the tank bracket 20 with the strap bolt cowl and each alignment pin 21 jutting out from each side of the U-bend 23. See FIGS. 1, 5, and 6 in particular. The alignment pin 21 acts like a first mating component as described above in the summary section above. Additionally, each tank bracket 20 has lower strap bolt holes 24 through the U-bend 23 near the end of the tank bracket 20 opposite the end with the strap bolt cowl 22. Additionally, bracket to bracket inner bolt holes 25 exist through the u-bend 23. See FIGS. 5 and 6. Each tank strap 40 is a flexible piece made preferably of a strong steel such as stainless steel and has a means for attaching an upper strap bolt 45 to one end of the tank strap 40. The upper strap bolt 45 is parallel to the length of the tank strap 40. The opposite end of the tank strap 40 from the end with the upper strap bolt 45 has a means for attaching a lower strap bolt 46. The tank straps 40 are of a length such that when combined with the tank brackets 40 around the fuel tank 11, the result is a tight fit around the outer diameter of the fuel tank 11. See FIGS. 1–4.

Separate from the main vehicle assembly line, the fuel tank 11 is lined up in contact with the mating surfaces 28 of one of the tank brackets 20. One of the tank straps 40 is wrapped around the fuel tank 11, with the lower strap bolt 46 attaching the lower end of the tank strap 40 to the lower strap bolt hole 24 of the tank bracket 20 and the upper strap bolt 45 passing through a hole in the bolt cowl 22 of the tank bracket 20. Nuts are fastened to the upper strap bolt 45 and the lower strap bolt 46 to tightly bind the combination of the tank bracket 20 and the tank strap 40 to the outer diameter of the fuel tank 11. The above process is repeated for each tank bracket 20 and tank strap 40 pair to be installed.

Should entry/egress steps be desired, upper step brackets 43 and lower step brackets 44 are spot welded or riveted onto the outer face of the tank straps 40 in the desired positions. The upper step 41 and lower step 42 are then affixed to the upper step brackets 43 and lower step brackets 44 respectively. See FIGS. 1–4.

It should be noted that the above described assembly away from the main vehicle assembly line allows for alignment of items on and to the fuel tank 11 such as placement of a fuel filling cap for the fuel tank 11 and tank name plates. This alignment of the fuel tank 11 can be performed without impeding the progress on the main assembly line.

The rail brackets 30 have at least three sides when viewed from the side and are u-shaped when viewed from the top and bottom. The rail brackets shown in FIGS. 1, 2 and 8 have 4 sides when viewed from the side. Each rail bracket 30 has a front face 37 and a rear face 38. See FIGS. 1, 2, 8 and 9. The front faces 37 and rear faces 38 of the rail brackets 30 have top sides 36 each with an alignment notch 32 and sides shaped to conform with the semi-circular shape of the tank bracket 20. The alignment notches 32 act as second mating components combined with the alignment pins 21 of the tank brackets 20 as first mating components to comprise an initial alignment means as described above in the summary section. When viewed from the top, the rail brackets 30 have an inner width slightly wider than the outer width of the u-bend 23 of the tank bracket 20. Each rail bracket 30 has two fixed nuts 33 attached to the front face 37 and two bracket-to-bracket outer bolt holes 35 in each of the front face 37 and rear face 38 corresponding to the bracket-to-bracketinner bolt holes 25 on the tank bracket 20. The rail brackets 30 are bolted to the frame rail 12 of the vehicle 101 via rail bolts 31 through rail bracket-to-frame holes 34 in the rail bracket 30. This installation of the rail brackets 30 to the frame rail 12 can occur while the vehicle 101 is on the main assembly line.

Once the fuel tank 11, tank brackets 20, tank straps 40, upper step 41 and lower step 43 are combined (referred to as the fuel tank 11 and attachments from here on in) and the rail brackets 30 are installed on the frame rail 12, the fuel tank 11 with attachments is brought to the main assembly line and raised up to the rail brackets 30. The alignment pins 21 on the tank brackets 20 fit into the alignment notches 32 on the rail brackets 30. The fuel tank 11 and attachments may be released with the fuel tank 11 and attachments pivoting down and inwards due to the force of gravity. The u-bends 23 of the tank brackets 20 slip into the gap between the front faces 37 and the rear faces 38 of the rail brackets 30. The rail brackets 30 will support the fuel tank 11 and attachments via the alignment notches 32. The tank brackets 20 may be finally attached to the rail brackets 30 via bolts 29 (not shown) through the bracket-to-bracketouter bolt holes 35 and the bracket-to-bracketinner bolt holes 25 to the fixed nuts 33 of the rail brackets 30. A spacer 27 (not shown) may be inserted into the inner portion of the u-bend 23 of the tank bracket 20 for added stability. Where the spacer 27 is used, the bolts 29 will pass through holes in the spacer 27 in addition to the above described components.

Figure 12:
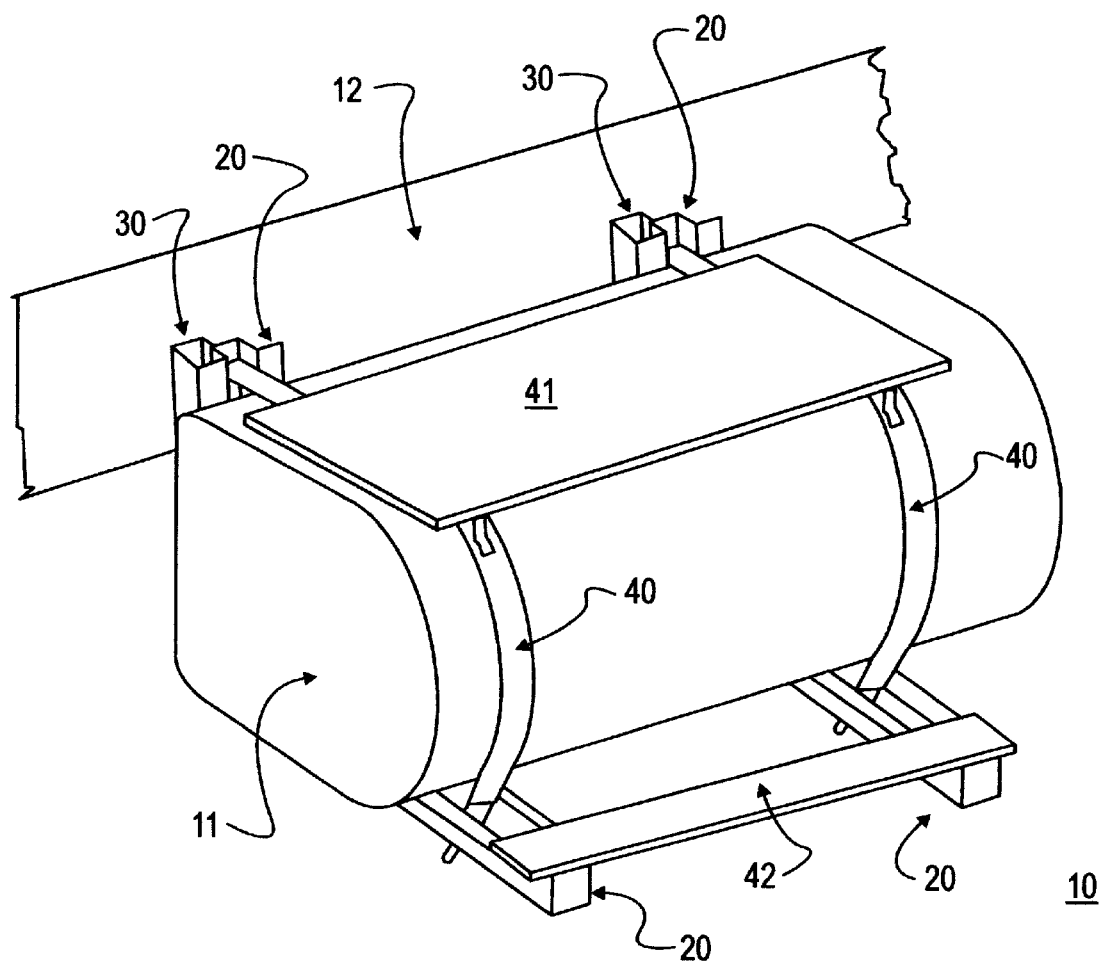
FIG. 12 is a perspective view of the fuel tank assembly of the present invention installed to a frame rail of a vehicle using a 'D' shaped tank.

As mentioned earlier the bracket-to-bracket attachment method with an initial alignment means may be used for attaching other components in a pre-assembled form. One component mentioned earlier is the installation of a 'D' or rectangular shaped tank assembly. The main variation from the above described cylindrical tank version of the invention is that the tank bracket 20 would be 'L' shaped to accommodate the bottom and one side of the 'D' shaped tank and the tank strap 40 would be bent accordingly to encircle the 'D' shape when combined with the tank bracket 20. The lower portion of the tank strap 40 would not necessarily be engaged to an end of the tank bracket 20 as a lower portion of the tank bracket 20 could extend out from underneath the tank 11 with the lower portion of the tank strap 40 attached to the tank bracket 20 just short of an end of the tank bracket 20. See FIG. 12. The extension of tank bracket 20 would remove the need for the lower step brackets 44 as the lower step 42 would be attached to the extended portion of the tank brackets 20. The initial alignment means for the 'D' shaped tank would be the same as the cylindrical tank, that being by alignment pins 21 on the tank bracket lining up with alignment notches 32 on the rail brackets.

Another component assembly attached to a vehicle with the bracket-to-bracket attachment through an initial alignment means is a vehicle battery box. The initial alignment means for a battery box is different in that instead of an alignment pin and notch arrangement, a tab(s) which turns downwards and extends out from the back of the bracket on the battery box. Following installation of this box bracket on the battery box, the battery box is moved up to the rail bracket mounted on the vehicle with the tab(s) fitting into a slot(s) on the rail bracket. The tab(s) allows for little or no alignment effort. With the battery box temporarily held to the vehicle via the tab and slot initial alignment means, final attachment of the box bracket to the rail bracket is made and hence final attachment of the battery box to the vehicle. A pair of outer brackets on the side of the battery box would accommodate entry/egress stairs to the vehicle. Another component to be installed with this methodology is a combination battery box and vehicle air tank assembly. The battery box would be installed to the vehicle as described above with the vehicle air tanks mounted to the underside of the battery box at the same time the component brackets are installed on the battery box performed off of the vehicle main assembly line. An additional version of the invention would be a step access platform installed with the methodology of this invention.

As described above the fuel tank assembly 10 and method of installing same of the present invention provide a number of advantages, some of which have been described above, and others of which are inherent in the invention. Also, modifications may be proposed to the fuel tank assembly 10 and method without departing from the teachings herein. Accordingly, the scope of the invention is only to be limited as necessitated by the accompanying claims.

What is claimed is:

1. A fuel tank assembly adapted for installation on a mobile vehicle with a frame rail, comprising:
   (a) a fuel tank;
   (b) two tank brackets and two tank straps attached to said fuel tank;
   (c) each said tank strap combined with one of said tank brackets to encircle said fuel tank;
   (d) two rail brackets attached to the frame rail of the vehicle;
   (e) an initial alignment means comprised of two sets of mating components, a first mating component of each of said sets of mating components installed on each of said tank brackets and a second mating component of each of said sets of mating components installed on each of said rail brackets;
   (f) each of said tank brackets being attachable to one of said rail brackets via an attachment between said first mating components and said second mating components;
   (g) said initial alignment means allowing the frame rail, and said rail bracket to provide downward vertical and horizontal support to said combination of said fuel tank, said tank brackets, and said tank straps; and
   (h) a permanent attachment means between each of said tank brackets and one of said rail brackets.

2. A fuel tank assembly adapted for installation on a mobile vehicle with a frame rail, comprising:
   (a) a fuel tank;
   (b) two tank brackets attached to said fuel tank;
   (c) two rail brackets attached to the frame rail of the vehicle;
   (d) an initial alignment means comprised of two sets of mating components, a first mating component of each of said sets of mating components installed on each of said tank brackets and a second mating component of each of said sets of mating components installed on each of said rail brackets;
   (e) each of said tank brackets being attached to one of said rail brackets via an attachment between said first mating components and said second mating components;
   (f) a permanent attachment means between each of said tank brackets and one of said rail brackets;
   (g) said fuel tank is cylindrically shaped;
   (h) each of said tank brackets is a semi-circularly shaped piece formed with a mating surface to fit flush against a portion of outer radial surface of said fuel tank;
   (i) each of said tank brackets has an upraised u-bend when viewed cross sectionally;
   (j) each of said first mating components is comprised of two alignment pins jutting out symmetrically on each side of said u-bend near one end of each of said tank brackets;
   (k) each of said tank brackets being attached to said fuel tank via a tank strap wrapped around said fuel tank and engaged at each end to an end of each of said tank brackets;
   (l) each of said rail brackets has at least three sides in a side view and is u-shaped in a top view, each of said rail brackets having two top sides and each rail bracket having two sides shaped to conform with said semi-circular shape of said tank brackets;
   (m) said rail brackets having an inner width on a top view which is slightly wider than an outer width of said u-bends of said tank brackets; and
   (n) each of said second mating components is comprised of an alignment notch on each of said top sides of said rail brackets, said alignment notches being sized to receive said alignment pins of said tank brackets.

3. The fuel tank assembly of claim 2, further comprising:
   (a) two upper step brackets attached to an outer surface of each of said tank straps; and
   (b) an upper vehicle entry and egress step attached to said upper step brackets.

4. The fuel tank assembly of claim 3, further comprising:
   (a) two lower step brackets attached to an outer surface of each of said tank straps; and
   (b) a lower vehicle entry and egress step attached to said lower step brackets.

5. The fuel tank assembly of claim 2, wherein:
   said permanent attachment means is bolting passing through holes in said rail brackets and said u-bends of said tank brackets with fixed bracket nuts holding said bolting in place.

6. The fuel tank assembly of claim 2, wherein:
   (a) each of said tank brackets is further comprised of a bolt cowl at said end of said tank brackets near said alignment pins;
   (b) each of said tank straps is engaged to a top side of said tank brackets via an upper strap bolt attached to a top end of said tank strap and parallel to said tank strap; and
   (c) said upper strap bolts passing through holes in said bolt cowls and each of said upper strap bolts being held in place with a strap nut.

7. A fuel tank assembly adapted for installation on a mobile vehicle with a frame rail, comprising:
   (a) a fuel tank;
   (b) two tank brackets attached to said fuel tank;
   (c) two rail brackets attached to the frame rail of the vehicle;
   (d) an initial alignment means comprised of two sets of mating components, a first mating component of each of said sets of mating components installed on each of said tank brackets and a second mating component of each of said sets of mating components installed on each of said rail brackets;
   (e) each of said tank brackets being attached to one of said rail brackets via an attachment between said first mating components and said second mating components;
   (f) a permanent attachment means between each of said tank brackets and one of said rail brackets;
   (g) said fuel tank is D-shaped;
   (h) each of said tank brackets is an L-shaped piece formed with a mating surface to fit flush against a portion of outer surface of a bottom and a back side of said fuel tank;
   (i) each of said tank brackets has an upraised u-bend when viewed cross sectionally;
   (j) each of said first mating components is comprised of two alignment pins jutting out symmetrically on each side of said u-bend near one end of each of said tank brackets;

(k) each of said tank brackets being attached to said fuel tank via a tank strap wrapped around said fuel tank and engaged at each end to a portion of said tank brackets;

(l) each of said rail brackets has at least three sides in a side view and is u-shaped in a top view, each of said rail brackets having two top sides and each rail bracket having two sides shaped to conform with said semicircular shape of said tank brackets;

(m) said rail brackets having an inner width on a top view which is slightly wider than an outer width of said u-bends of said tank brackets; and (n) each of said second mating components is comprised of an alignment notch on each of said top sides of said rail brackets, said alignment notches being sized to receive said alignment pins of said tank brackets.

8. The fuel tank assembly of claim 7, further comprising:

(a) two upper step brackets attached to an outer surface of each of said tank straps; and (b) an upper vehicle entry and egress step attached to said upper step brackets.

9. The fuel tank assembly of claim 8, further comprising:

(a) said tank brackets extend out horizontally beyond said fuel tank; and (b) a lower vehicle entry and egress step is attached to said horizontal extensions of said tank brackets.

10. The fuel tank assembly of claim 7, wherein:

said permanent attachment means is bolting passing through holes in said rail brackets and said u-bends of said tank brackets with fixed bracket nuts holding said bolting in place.

11. A method for installing a fuel tank on a mobile vehicle with a frame rail, comprising the steps of:

(a) attaching two tank brackets to a fuel tank by combining a tank strap with each tank bracket to individually encircle the fuel tank;

(b) attaching two rail brackets to the frame rail of the vehicle;

(c) attaching each of said tank brackets to one of said rail brackets via an initial alignment means, said initial alignment means comprised of two sets of mating components, a first mating component of each of said sets of mating components installed on each of said tank brackets and a second mating component of each of said sets of mating components installed on each of said rail brackets, said tank bracket to rail bracket attachment accomplished by an attachment between said first mating components and said second mating components, said initial alignment means allowing the frame rail, and the rail bracket to provide downward vertical and horizontal support to said combination of said fuel tank, said tank brackets, and said tank straps; and (d) attaching each of said tank brackets to one of said rail brackets via a permanent attachment means.

12. A method for installing a modular component on a mobile vehicle with a frame rail, comprising the steps of:

(a) attaching a component bracket to a modular component;

(b) attaching a rail bracket to the frame rail of the vehicle;

(c) attaching said component bracket to said rail bracket via an initial alignment means, said initial alignment means comprised of two mating components, a first mating component of said mating components installed on said component bracket and a second mating component of said mating components installed on said rail bracket, said component bracket to rail bracket attachment accomplished by an attachment between said first mating component and said second mating component;

(d) attaching said component bracket to said rail bracket via a permanent attachment means; and wherein (e) said modular component is a battery box;

(f) said first mating component is comprised of:
 (i) a tab on said component bracket; and
 (ii) said tab being turned downwards; and (g) said second mating component comprising:
 (i) a slot on said rail bracket, said slot sized to receive said tab of said component bracket.

13. A modular component assembly adapted for installation on a mobile vehicle with a frame rail, comprising:

(a) a modular component;

(b) a component bracket attached to said modular component;

(c) a rail bracket attached to the frame rail of the vehicle;

(d) an initial alignment means comprised of two mating components, a first of said mating components installed on said component bracket and a second of said mating components installed on said rail bracket;

(e) said component bracket attached to said rail bracket via an attachment between said first mating component and said second mating component;

(f) a permanent attachment means between said component bracket and said rail bracket;

(g) said modular component is a battery box;

(h) said first mating component is comprised of:
 (i) a tab on said component bracket; and
 (ii) said tab being turned downwards; and (l) said second mating component comprising:
 (i) a slot on said rail bracket, said slot sized to receive said tab of said component bracket.

14. A fuel tank assembly adapted for installation on a mobile vehicle with a frame rail, comprising:

(a) a fuel tank;

(b) two tank brackets attached to said fuel tank;

(c) two rail brackets attached to the frame rail of the vehicle;

(d) an initial alignment means comprised of two sets of mating components, a first mating component of each of said sets of mating components installed on each of said tank brackets and a second mating component of each of said sets of mating components installed on each of said rail brackets;

(e) each of said tank brackets being attached to one of said rail brackets via an attachment between said first mating components and said second mating components;

(f) a permanent attachment means between each of said tank brackets and one of said rail brackets;

(g) said fuel tank is rectangularly shaped;

(h) each of said tank brackets is an L-shaped piece formed with a mating surface to fit flush against a portion of outer surface of a bottom and a back side of said fuel tank;

(i) each of said tank brackets has an upraised u-bend when viewed cross sectionally;

(j) each of said first mating components is comprised of two alignment pins jutting out symmetrically on each side of said u-bend near one end of each of said tank brackets;

(k) each of said tank brackets being attached to said fuel tank via a tank strap wrapped around said fuel tank and engaged at each end to a portion of said tank brackets;

(l) each of said rail brackets has at least three sides in a side view and is u-shaped in a top view, each of said rail brackets having two top sides and each rail bracket having two sides shaped to conform with said semi-circular shape of said tank brackets;

(m) said rail brackets having an inner width on a top view which is slightly wider than an outer width of said u-bends of said tank brackets; and (n) each of said second mating components is comprised of an alignment notch on each of said top sides of said rail brackets, said alignment notches being sized to receive said alignment pins of said tank brackets.

15. The fuel tank assembly of claim 14, further comprising:

(a) two upper step brackets attached to an outer surface of each of said tank straps; and (b) an upper vehicle entry and egress step attached to said upper step brackets.

16. The fuel tank assembly of claim 15, further comprising:

(a) said tank brackets extend out horizontally beyond said fuel tank; and (b) a lower vehicle entry and egress step is attached to said horizontal extensions of said tank brackets.

17. A method for installing a fuel tank on a mobile vehicle with a frame rail, comprising the steps of:

(a) attaching two tank brackets to a fuel tank;

(b) attaching two rail brackets to the frame rail of the vehicle;

(c) attaching each of said tank brackets to one of said rail brackets via an initial alignment means, said initial alignment means comprised of two sets of mating components, a first mating component of each of said sets of mating components installed on each of said tank brackets and a second mating component of each of said sets of mating components installed on each of said rail brackets, said tank bracket to rail bracket attachment accomplished by an attachment between said first mating components and said second mating components; and (d) attaching each of said tank brackets to one of said rail brackets via a permanent attachment means; and wherein (e) said fuel tank is cylindrically shaped;

(f) each of said tank brackets is a semi-circularly shaped piece formed with a mating surface to fit flush against a portion of outer radial surface of said fuel tank;

(g) each of said tank brackets has an upraised u-bend when viewed cross sectionally;

(h) each of said first mating components is comprised of two alignment pins jutting out symmetrically on each side of said u-bend near one end of each of said tank brackets;

(i) each of said tank brackets being attached to said fuel tank via a tank strap wrapped around said fuel tank and engaged at each end to an end of each of said tank brackets;

(j) each of said rail brackets has at least three sides in a side view and is u-shaped in a top view, each of said rail brackets having two top sides and each rail bracket having two sides shaped to conform with said semi-circular shape of said tank brackets;

(k) said rail brackets having an inner width on a top view which is slightly wider than an outer width of said u-bends of said tank brackets; and (l) each of said second mating components is comprised of an alignment notch on each of said top sides of said rail brackets, said alignment notches being sized to receive said alignment pins of said tank brackets.

18. The method for installing a fuel tank of claim 17, which further comprises the steps of:

(e) attaching an upper step bracket to an outer surface of each of said tank straps; and (f) attaching an upper step to said upper step brackets.

19. The method for installing a fuel tank of claim 18, which further comprises the steps of:

(g) attaching a lower step bracket to an outer surface of each of said tank straps; and (h) attaching a lower step to said lower step brackets.

20. The method for installing a fuel tank of claim 17, wherein:

said permanent attachment means is bolting passing through holes in said rail brackets and said u-bends of said tank brackets with fixed bracket nuts holding said bolting in place.

21. The method for installing a fuel tank of claim 17, wherein:

(i) each of said tank brackets is further comprised of a bolt cowl at said end of said tank brackets near said alignment pins;

(ii) each of said tank straps is engaged to a top side of said tank brackets via an upper strap bolt attached to a top end of said tank strap and parallel to said tank strap; and (iii) said upper strap bolts passing through holes in said bolt cowls of said tank brackets and each said upper strap bolts being held in place with a strap nut.

22. A method for installing a fuel tank on a mobile vehicle with a frame rail, comprising the steps of:

(a) attaching two tank brackets to a fuel tank;

(b) attaching two rail brackets to the frame rail of the vehicle;

(c) attaching each of said tank brackets to one of said rail brackets via an initial alignment means, said initial alignment means comprised of two sets of mating components, a first mating component of each of said sets of mating components installed on each of said tank brackets and a second mating component of each of said sets of mating components installed on each of said rail brackets, said tank bracket to rail bracket attachment accomplished by an attachment between said first mating components and said second mating components; and (d) attaching each of said tank brackets to one of said rail brackets via a permanent attachment means; and wherein (e) said fuel tank is D-shaped;

(f) each of said tank brackets is an L-shaped piece formed with a mating surface to fit flush against a portion of outer surface of a bottom and a back side of said fuel tank;

(g) each of said tank brackets has an upraised u-bend when viewed cross sectionally;

(h) each of said first mating components is comprised of two alignment pins jutting out symmetrically on each side of said u-bend near one end of each of said tank brackets;

(i) each of said tank brackets being attached to said fuel tank via a tank strap wrapped around said fuel tank and engaged at each end to a portion of said tank brackets;

(j) each of said rail brackets has at least three sides in a side view and is u-shaped in a top view, each of said rail brackets having two top sides and each rail bracket having two sides shaped to conform with said semi-circular shape of said tank brackets;

(k) said rail brackets having an inner width on a top view which is slightly wider than an outer width of said u-bends of said tank brackets; and (l) each of said second mating components is comprised of an alignment notch on each of said top sides of said rail brackets, said alignment notches being sized to receive said alignment pins of said tank brackets.

23. The method for installing a fuel tank of claim 22, which further comprises the steps of:

(e) attaching an upper step bracket to an outer surface of each of said tank straps; and (f) attaching an upper step to said upper step brackets.

24. The method for installing a fuel tank of claim 23, which further comprises the step of:

(g) attaching a lower step to a horizontal extension of said tank brackets beyond said fuel tank.

25. The method for installing a fuel tank of claim 22, wherein:

said permanent attachment means is bolting passing through holes in said rail brackets and said u-bends of said tank brackets with fixed bracket nuts holding said bolting in place.

* * * * *